United States Patent
Gass

(10) Patent No.: US 9,163,357 B2
(45) Date of Patent: Oct. 20, 2015

(54) PROCESS FOR PROVIDING AND PROCESSING NATURAL FIBRES

(75) Inventor: Michael Ludwig Gass, Olten (CH)

(73) Assignee: BIOWERT AG, Aarau (CH)

( * ) Notice: Subject to any disclaimer, the term of this patent is extended or adjusted under 35 U.S.C. 154(b) by 0 days.

(21) Appl. No.: 13/982,338

(22) PCT Filed: Jan. 26, 2012

(86) PCT No.: PCT/EP2012/000348
§ 371 (c)(1),
(2), (4) Date: Jul. 29, 2013

(87) PCT Pub. No.: WO2012/104040
PCT Pub. Date: Aug. 9, 2012

(65) Prior Publication Data
US 2013/0310489 A1    Nov. 21, 2013

(30) Foreign Application Priority Data
Feb. 2, 2011 (DE) .......................... 10 2011 010 192

(51) Int. Cl.
| | |
|---|---|
| *D21C 3/00* | (2006.01) |
| *C08J 5/04* | (2006.01) |
| *C08J 5/06* | (2006.01) |
| *D01B 1/48* | (2006.01) |
| *D01C 1/02* | (2006.01) |
| *D06M 15/227* | (2006.01) |

(52) U.S. Cl.
CPC . *D21C 3/00* (2013.01); *C08J 5/045* (2013.01); *C08J 5/06* (2013.01); *D01B 1/48* (2013.01); *D01C 1/02* (2013.01); *D06M 15/227* (2013.01)

(58) Field of Classification Search
CPC ................ C08J 5/045; C08J 5/06; D21C 3/00
USPC ........................................ 524/9; 162/10, 100
See application file for complete search history.

(56) References Cited

U.S. PATENT DOCUMENTS

| | | |
|---|---|---|
| 3,694,308 A | 9/1972 | Botz |
| 6,740,342 B1 | 5/2004 | Hulst et al. |
| 2010/0147474 A1 | 6/2010 | Grass |
| 2010/0176354 A1 | 7/2010 | Costard |

FOREIGN PATENT DOCUMENTS

| | | |
|---|---|---|
| DE | 102007039600 | 2/2008 |
| WO | 0040788 | 7/2000 |
| WO | 2005017251 | 2/2005 |
| WO | 2007105878 | 9/2007 |
| WO | 2008116340 | 10/2008 |
| WO | 2009003606 | 1/2009 |
| WO | 2011047804 | 4/2011 |

OTHER PUBLICATIONS

Keener, T. J., et al. "Maleated coupling agents for natural fibre composites," Composites: Part A, 2004, 35, 357-362.*
International Search Report for PCT/EP2012/000348, English translation attached to original, Both completed by the European Patent Office on May 3, 2012, All together 7 Pages.
Chan et al. XP002675173, WPI / Thomson, 2007, 4 Pages, "Herbaceous plant e.g. rice straw, refiner manufacturing method, involves manufacturing refiner with application of function of common home mixer function by making blade of rotation wing blunt."

\* cited by examiner

*Primary Examiner* — Liam J Heincer
*Assistant Examiner* — Nicholas Hill
(74) *Attorney, Agent, or Firm* — Brooks Kushman P.C.

(57) ABSTRACT

A process for providing and processing natural fibres, wherein the process includes the following steps: 1) providing a biomass including fibres and having a dry substance content of at most 50% by weight; 2) adding water to produce a suspension including the biomass; 3) extracting the natural fibres from the biomass; 4) separating the liquid from the suspension; 5) at least single repetition of at least one of steps 2) to 4), the suspension having at least one agent for finishing of the fibres in the last repetition of at least one of steps 2) to 4); and 6) drying the natural fibres.

17 Claims, 1 Drawing Sheet

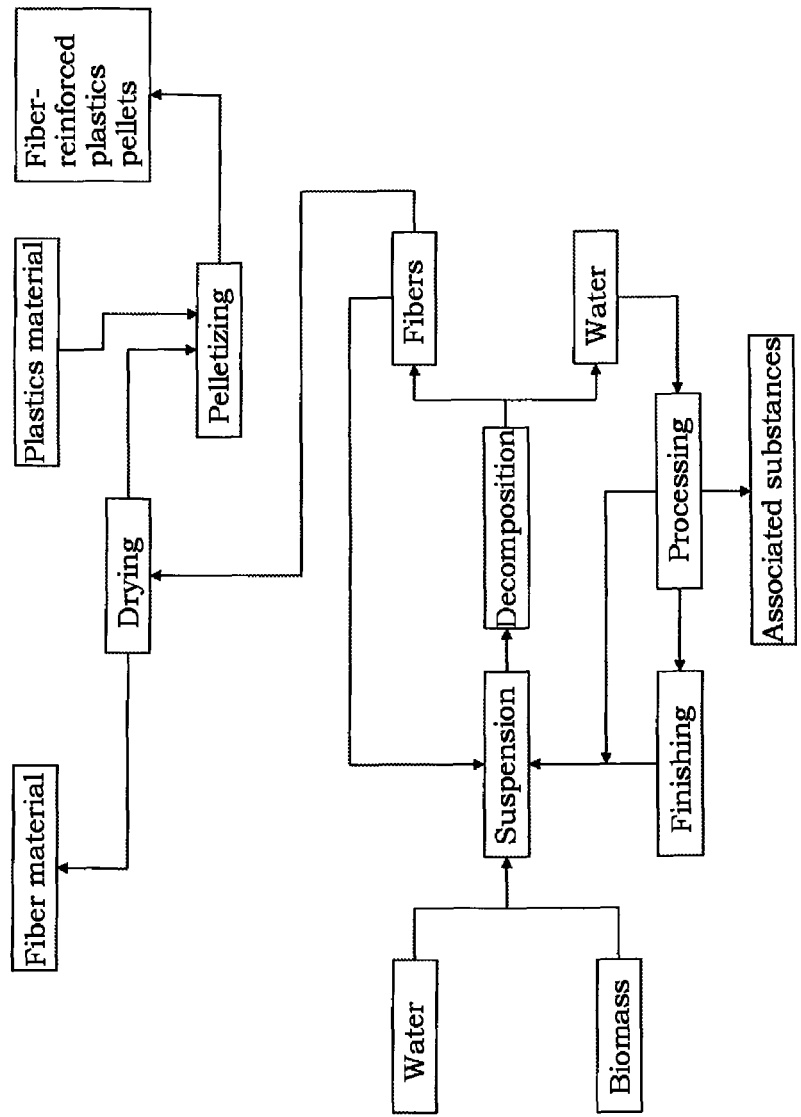

PROCESS FOR PROVIDING AND PROCESSING NATURAL FIBRES

CROSS-REFERENCE TO RELATED APPLICATION

This application is the U.S. national phase of PCT Application No. PCT/EP2012/000348 filed on Jan. 26, 2012, which claims priority to German Patent Application No. 10 2011 010 192.6 filed on Feb. 2, 2011, the disclosures of which are incorporated in their entirety by reference herein.

The invention relates to a process for producing and processing natural fibers.

It is known from the prior art to mix natural fibers such as hemp, flax or also wood fibers with a plastics material such as polyethylene. Such natural fibers have the advantage that they are fully biodegradable and have a low density. Hitherto, however, it was a disadvantage that a plastics material provided with natural fibers had impaired mechanical properties compared with a pure plastics material or even a plastics material reinforced with glass fibers. Therefore, natural fibers have hitherto been regarded predominantly as a filler, used simply to reduce the proportion of non-organic material. Moreover, the field of use was limited owing to the poor mechanical properties of such compounds. A main field of use of conventional plastics materials provided with natural fibers is in automotive construction, where, for example, linings in the interior of a motor vehicle are produced from such materials.

In principle, different forms of natural fibers can be distinguished:

Wood fibers consist of elongate wood cells, wood fibers comprising approximately one fifth lignin and four fifths cellulose, depending on the type of wood.

Bast fibers consist of multi-cellular fiber bundles. They are elongate, thick-walled cells, which are non-woody. The main constituent of bast fibers are layers, substantially of different thicknesses, of elongate cellulose fibrils, which are surrounded by hemicellulose. Typical natural fibers based on bast fibers are, for example, hemp fibers.

Natural fibers from green waste, in particular from grass cuttings or rye cuttings, consist predominantly of hard fibers, which are likewise based substantially on cellulose. Hard fibers mostly have a higher hardness than bast fibers, but hard fibers are more sensitive to bending stress.

The object underlying the invention is to provide a process for producing natural fibers which permits the production of durable natural fibers which are able to withstand mechanical stress.

The object is achieved by the features of claim 1. The dependent claims relate to advantageous embodiments.

The process according to the invention for providing and processing natural fibers comprises the following steps:
1) providing a biomass comprising natural fibers and having a dry matter content of not more than 50% by weight;
2) adding water in order to prepare a suspension comprising the biomass;
3) extracting the natural fibers from the biomass;
4) separating the liquid from the suspension;
5) repeating steps 2) to 4) at least once, wherein in the last repetition of steps 2) to 4) the suspension comprises at least one agent for finishing the natural fibers;
6) drying the natural fibers.

In step 1, a biomass comprising natural fibers is provided. It can be plant parts of different plants containing natural fibers. Plant parts that are not woody and therefore comprise only small amounts of lignin or no lignin, in particular less than 5% by weight lignin, are particularly suitable for the described process. Plant parts that are cornified to only a small degree or not cornified at all are also advantageous. Cornification in plant fibers is generally caused by drying. The removal of water leads to the formation of covalent bonds between the cellulose molecules, as a result of which the plant fibers become brittle and the tendency to break increases. It is therefore proposed to use plant parts that have not been dried.

There are suitable for the process according to the invention on the one hand freshly cut grass and on the other hand grass silage. In that manner, fiber qualities whose dry matter contents are between 25 and 40% by weight are provided as starting material. The dry matter content refers to the content of dry matter that remains when all the water is removed. A content of dry matter of from 25 to 40% by weight therefore corresponds, inversely, to a water content of between 75 and 60% by weight. Silaging additionally has the advantage that grass, which is available only at particular times of the year, can be processed throughout the year without any loss of quality. A further suitable material is rye green waste, it being possible to use other renewable fiber-containing raw materials that are available according to the region. However, these should have a low content of lignin and consist predominantly of hard fibers.

In step 2, a suspension comprising the biomass is prepared by addition of water. To that end, the biomass is introduced into a mixing tank, for example, water is added, and a suspension is formed by means of a stirrer mechanism arranged in the mixing tank. This suspension facilitates the further treatment of the biomass. In the process according to the invention, the preparation of the suspension is carried out solely with water, which in the subsequent steps also forms the solvent that takes up the soluble constituents of the biomass. In this step, a first purification of the biomass is also carried out, wherein impurities and undesirable associated substances adhering to the biomass are dissolved in the water. It is particularly advantageous in this connection that the liberation of the natural fibers from the biomass takes place without the use of chemicals which may be harmful to the environment. The solvent is solely water.

In step 3, the natural fibers are extracted from the biomass. The extraction is preferably carried out using a macerator, which separates the suspended biomass fed to the macerator into individual constituents and, owing to the friction that is generated, opens the cells filled with cellular fluid and allows the cell sap to escape. To that end, a macerator has a rotating cutting blade which scrapes along a counter-blade, with or without contact. The counter-blade can also be in the form of a sieve. The result of the maceration is a suspension in which the natural fibers contained in the biomass are isolated and the liquid constituents contained in the biomass go into solution in the aqueous suspension.

The extracted isolated natural fibers consist substantially of alpha-cellulose and hemicellulose, the ratio between these two types of cellulose being dependent on the time of cutting of the biomass. For the use of the natural fibers as reinforcing fibers in a plastics compound, both types of cellulose are relevant: the alpha-cellulose permits high mechanical stability of the fibers, and the hemicellulose allows the finishing agent, for example the adhesion promoter or flame retardant, to be taken up uniformly. Furthermore, hemicellulose improves the processability of the plastics compound, in particular its flowability during thermoplastic processing. Preferred amounts of alpha-cellulose and hemicellulose are, in each case based on the total mass, from 20 to 30% by weight alpha-cellulose and from 15 to 25% by weight hemicellulose;

the fiber-containing biomass particularly preferably comprises 25% by weight alpha-cellulose and 15% by weight hemicellulose. Overall, the amount of alpha-cellulose should be greater than the amount of hemicellulose.

In step 4, the liquid is separated from the suspension. To that end, the suspension is fed to a press, preferably a screw press. In the press, the liquid with the constituents dissolved in the liquid, such as cellular water, carbohydrates, proteins and impurities, is separated from the solid material contained in the biomass, the solid material comprising in particular the natural fibers.

In step 5, at least one of steps 2 to 4 is repeated at least once, preferably twice. Purified water is used to prepare the suspension in each case. By repeating steps 2 to 4, which can also be referred to as a purification process, a particularly high degree of purity of the natural fibers is obtained. This high purity of the natural fibers is characterized by a particularly low content of carbohydrates and proteins in the natural fibers. In tests it has been shown that impurities, which are formed in particular of carbohydrates and proteins, that adhere or are firmly bonded to the natural fibers impair the ability of an agent for finishing to be fixed to the natural fibers. Overall, it has been shown that the ability of the finishing agent to be fixed is better, the greater the degree of purity of the natural fibers consisting of cellulose compounds. Furthermore, natural fibers with high purity are particularly durable even without additional finishing, which is an advantage in particular where the natural fibers are used as an insulating material.

The degree of purity of a natural fiber can be quantified by the degree of dyeability. To that end, natural fibers are dyed with a dye, and the manner in which the dye has been incorporated into or deposited on the natural fibers is then studied.

In the last repetition of steps 2 to 4, an agent for finishing the natural fibers is added to the suspension. It is further conceivable to add a combination of different agents to the suspension. The finishing agent is deposited on the natural fibers from the suspension, that is to say from the wet phase. It is particularly advantageous that the natural fibers have hitherto been kept moist and no cornification of the fibers has yet taken place. Accordingly, there have formed between the cellulose molecules no or only a few covalent bonds which can make the cellulose molecules less accessible and prevent the finishing agent from being deposited on the natural fibers. Owing to the treatment of the natural fibers in the wet phase, the agent penetrates into the matrix of the natural fibers and, when drying is complete, is firmly bonded to the natural fibers. A very wide variety of additives which impart to the natural fibers particular properties, for example increased mechanical strength values, a particular coloring, light fastness, improved adhesion behavior or reduced flammability, are suitable as agents for finishing.

In step 6, drying of the natural fibers is carried out. In the process according to the invention, this is the first drying of the natural fibers, which have always been kept moist up to this point. Drying is carried out, with regard to the drying temperature and the drying time, in such a manner that the natural fibers are not damaged and cornification is largely prevented. Furthermore, drying is carried out in such a manner that a sufficient amount of residual moisture remains in the natural fibers so that cornification of the natural fibers does not take place even when drying is complete. In this connection, a content of dry matter of from 88 to 92% by weight, at most 95% by weight, is particularly advantageous. Those values correspond in other words to a residual moisture content of 5% by weight or from 8 to 12% by weight. The natural fibers thus retain their flexibility, which has a positive effect on their mechanical stability during the later use of the natural fibers, for example as a fiber reinforcement in a plastics material.

Drying preferably takes place in a multi-stage process. A particularly advantageous drying process comprises a two-stage drying.

In a first stage, preliminary drying, drying takes place in a belt drier. An advantageous drying of the first stage takes place at warm air temperatures of from 60 to 80° C. and with a dwell time of from 25 to 35 minutes. The temperature is so chosen that cornification of the natural fibers is largely prevented. Excessive local drying of the natural fibers facing the air stream is also prevented.

In a second stage, final drying, the natural fibers are dried in an air stream, the natural fibers being exposed directly to a heated air stream and being carried along therewith. A dispersion drier is preferably used for that purpose, in which the natural fibers and the air stream are guided co-currently through the dispersion drier. The air temperature of the heated air stream is preferably between 75° C. and 110° C., and the dwell time of the natural fibers is from 0.5 to 3 s.

By means of the agent for finishing, the natural fiber is finished to give a functional natural fiber which has particular technical properties according to requirements and the intended use. For better bonding with plastics materials, in particular thermoplastic plastics materials, the agent can comprise an adhesion promoter. This can comprise a carboxylated polypropylene, maleic anhydride in particular being used for the carboxylation. Such adhesion promoters improve the adhesion of the plastics molecules, in particular of polypropylene, to the natural fibers, yielding a fiber-reinforced plastics material having improved mechanical properties. In the preferred process, finishing with the adhesion promoter takes place in the aqueous phase. The adhesion promoter can be provided in solution or suspension in the water. In that manner, the adhesion promoter is absorbed into the fibers or deposited thereon. Finishing with the adhesion promoter can thus be carried out just as simply as a dyeing process.

It is advantageous in the process according to the invention if prior to the first drying, the natural fibers provided in the moist state are decomposed with the addition of water and then finished with the adhesion promoter. Good absorption of the adhesion promoter into the natural fibers is achieved in that manner. Drying before finishing, on the other hand, would lead to cornification of the natural fibers. As a result, not only would the mechanical properties of the natural fibers be impaired, but absorption with the adhesion promoter would also be made more difficult.

The natural fibers have a content of adhesion promoter of from 0.5% by weight to 5% by weight; the content of adhesion promoter is advantageously between 1% by weight and 3.5% by weight, a content of adhesion promoter of from 1.25% by weight to 2.5% by weight being particularly preferred.

In order to reduce the flammability of natural fibers in insulating materials or of a fiber-reinforced plastics article, the agent can comprise a flame retardant, in particular based on boron.

In order to improve the stability of the natural fibers, in particular of dyed natural fibers, to UV radiation, the agent for finishing can comprise a light stabilizer. A dye allows the natural fibers to be dyed, the dye adhering particularly well to the natural fibers according to the invention and end-to-end dyeing of the natural fibers being obtained.

The biomass comprising natural fibers can comprise grass cuttings and/or rye green waste. Grass cuttings and rye green waste are characterized by a particularly low content of lignin. The natural fibers of those substances consist predominantly of alpha- and hemi-cellulose. In general, a fiber-containing biomass having a low lignin content, in particular a lignin content of less than 5% by weight, is proposed as the raw material. Against this background, further conceivable raw materials are bargasse, in particular ensilaged sugar cane waste, and spent grains, in particular husk-containing brewer's grains. These natural fibers processed by the process according to the invention are present in particularly high purity, so that, when provided with an adhesion promoter, these natural fibers, as a fiber reinforcement in plastics materials, lead to a significant improvement in the mechanical properties of the plastics material. This is surprising because the grass fibers and rye fibers, which consist predominantly of hard fibers, were expected to have a lower strength than, for example, hemp fibers, which are based on bast fibers. In tests, however, it has surprisingly been shown that the tensile strength of a test specimen of thermoplastic plastics material reinforced with grass or rye fibers is better than that of a test specimen of thermoplastic plastics material reinforced with hemp fibers.

A fiber-reinforced plastics material according to the invention comprises a plastics material, in particular a thermoplastic plastics material, and natural fibers obtainable by the process according to the invention. As described above, a plastics material so fiber-reinforced with natural fibers has surprisingly good mechanical properties. Furthermore, the plastics material provided with the natural fibers can be processed in conventional installations for plastics processing; in particular, the plastics material provided with the natural fibers can be processed in conventional injection molding and extrusion installations.

An insulating material according to the invention comprises natural fibers obtainable by the process according to the invention. Such an insulating material consists of natural and biodegradable raw materials, the flammability being reduced by the addition of a flame retardant.

The natural fibers produced by the process according to the invention are further advantageously used as an additive for building materials, as materials for gardening and landscaping, and as a packaging material.

Further objects, features, advantages and possible applications of the present invention will become apparent from the following description of exemplary embodiments with reference to the drawing. All the features described and/or illustrated in the figures form the subject-matter of the invention on their own or in any desired combination, regardless of their association in individual claims or their dependency.

The FIGURE shows, in schematic form, a process for providing and processing natural fibers.

In step 1, a biomass comprising natural fibers is provided. It can be plant parts of different plants containing natural fibers. Plant parts that are not woody and therefore comprise only small amounts of lignin or no lignin are particularly suitable for the described process. Plant parts that are cornified to only a small degree or not cornified at all are also advantageous. Cornification in plant fibers is generally caused by drying. It is therefore proposed to use plant parts that have not been dried. There are suitable for the process according to the invention freshly cut grass or grass silage. In that manner, a biomass is provided whose dry matter content is between 25 and 40% by weight. The dry matter content refers to the content of dry matter that remains when all the water is removed. A content of dry matter of from 25 to 40% by weight therefore corresponds to a water content of between 75 and 60% by weight. Silaging has the advantage that grass, which is available only at particular times of the year, can be processed throughout the year without any loss of quality. A further suitable material is rye green waste, it being possible also to use other renewable fiber-containing raw materials that are available according to the region.

In step 2, a suspension comprising the biomass is prepared by addition of water. To that end, the biomass is introduced into a mixing tank, water is added, and a suspension is formed by means of a stirrer mechanism arranged in the mixing tank. A first purification of the biomass is also carried out in this step, impurities and undesirable associated substances adhering to the biomass being dissolved in the water.

In step 3, the natural fibers are extracted from the biomass. The extraction is carried out using a macerator, which separates the suspended biomass fed to the macerator into individual constituents and, owing to the friction that is generated, opens the cells filled with cellular fluid and allows the cell sap to escape. To that end, a macerator has a rotating cutting blade which scrapes, without contact, along a counter-blade in the form of a sieve. The result of the maceration is a suspension in which the natural fibers contained in the biomass are isolated and the liquid constituents contained in the biomass go into solution in the aqueous suspension.

The isolated natural fibers consist substantially of alpha-cellulose and hemicellulose, the natural fibers comprising 25% by weight alpha-cellulose and 15% by weight hemicellulose.

In step 4, the liquid is separated from the suspension. To that end, the suspension is fed to a screw press. In the screw press, the water with the constituents dissolved in the water, such as cellular water, carbohydrates, proteins and impurities, is separated from the natural fibers contained in the biomass.

Steps 2) to 4) described above are repeated twice. Purified water is used to prepare the suspension in each case, which means that water without the previously dissolved constituents is provided. By repeating steps 2 to 4, which can also be referred to as a purification process, a particularly high degree of purity of the natural fibers is obtained. In the last, that is to say the second, repetition of steps 2) to 4), an agent for finishing the natural fibers is added to the purified water. That agent is then dissolved in the aqueous suspension and is deposited on the natural fibers in the wet phase.

The purity of the natural fibers is demonstrated by a dyeing test. To that end, 0.5 g of direct dye is first dissolved in water having a temperature of 40° C. 2 g of Glauber's salt ($NaSO_4$) are then added to the solution, and the solution is heated to 60° C. Natural fibers are then added, and the fibers are removed after the first drying and have a content of dry matter of from 60 to 65% by weight. The mixture so formed is heated to 70° C., with stirring, and maintained at 70° C. for 30 minutes, with stirring. The natural fibers are then squeezed by means of a hand press, rinsed several times with water and dried in the air. Analysis of the natural fibers is carried out by means of a microscope. Dyes used are Columbia True Black BV 150% from CBW Chemie GmbH Wolfen, Solamin Light Yellow 5G 167% from CBW Chemie GmbH Wolfen, Solamin Light Scarlet FB 200% from CBW Chemie GmbH Wolfen, DyStar Remazol Yellow RR Gran from DyStar Colours Distribution GmbH Frankfurt am Main, DyStar Levafix Brilliant Red CA from DyStar Colours Distribution GmbH Frankfurt am Main, and DyStar Remazol Red CA Gran from DyStar Colours Distribution GmbH Frankfurt am Main. The natural fibers studied under the microscope are characterized by almost end-to-end dyeing, only small defects being present. Based on the surface area of a natural fiber that is visible under the microscope, the proportion by surface area of defects in a natural fiber is not more than 5%.

The purity of the natural fibers is further demonstrated by determining the chemical oxygen requirement. The chemical oxygen requirement is a measure of the sum of all substances present in the water that are oxidizable under specific conditions. The chemical oxygen requirement indicates the amount of oxygen, in mg/l, that would be required for their oxidation if oxygen were the oxidizing agent. The chemical oxygen requirement is determined using a sample removed from the aqueous phase of the suspension of water and biomass ultimately prepared. After separation of the natural fibers, this aqueous phase has a content of dry matter of less than 1% by weight, preferably less than 0.5% by weight and particularly preferably less than 0.25% by weight dry matter. The chemical oxygen requirement of the sample is less than 5000 mg/l, preferably less than 2000 mg/l.

For better bonding with thermoplastic plastics materials, the agent for finishing comprises an adhesion promoter based on a polypropylene carboxylated with maleic anhydride. In order to reduce the flammability of the natural fibers, the agent further comprises a flame retardant based on boron. If the natural fibers are to be used in areas exposed to UV light, the agent can additionally be provided with a light stabilizer, and a dye permits end-to-end dyeing of the natural fibers.

In step 5, drying of the natural fibers is carried out. In the process according to the invention, this is the first drying of the natural fibers, which have always been kept moist up to this point. In order to avoid cornification, drying is carried out in such a manner that the natural fibers have a content of dry matter of from 88 to 92% by weight, at most 95% by weight, when the drying is complete.

Drying takes place in a two-stage process. In a first stage, preliminary drying, drying takes place in a belt drier at warm air temperatures of from 60 to 80° C. and with a dwell time of the natural fibers in the belt drier of from 25 to 35 minutes. In order that the natural fibers nevertheless have a uniform residual moisture content, the belt drier is so configured that only a portion of the dried natural fibers is removed, while the remainder is fed to the belt drier again for repeated drying. To that end, the portion of the natural fibers that was remote from the air stream during the drying and therefore has the highest residual moisture content is fed back. Accordingly, only the portion of the natural fibers that has a uniformly low residual moisture content is removed. The drying parameters during drying in the first stage are so adjusted that the natural fibers have a residual moisture content of from 20 to 40% by weight, at most 50% by weight, after the first drying.

In a second stage, final drying, the natural fibers are introduced into an air stream of heated air and guided co-currently with the heated air, the natural fibers giving up moisture to the air guided co-currently. A dispersion drier is used for this drying. In this drier, the natural fibers are carried along in the air stream and dried in a short time. The air temperature of the heated air stream is preferably between 75° C. and 110° C., and the dwell time of the natural fibers in the device is preferably between 0.5 s and 3 s. To that end, the air stream is accelerated to a speed of from 1 m/s to 6 m/s by means of a fan.

The drying parameters during the drying in the second stage are so adjusted that the natural fibers have a content of dry matter of from 88 to 92% by weight, at most 95% by weight, after the second drying. When drying is complete, the natural fibers are separated from the air; this can be carried out, for example, by means of a cyclone.

The natural fibers removed after the second drying have a bulkiness of 41 kg/m³. The bulkiness can be quantified by a bulk weight, or by determining the bulk density. In order to determine the bulkiness, natural fibers are blown or introduced manually into a dimensionally stable container having clear dimensions of 1 m×1 m×0.25 m, which is open at the top, and skimmed off flush with the upper edge of the container, and then the mass of the natural fibers introduced into the container is weighed. The bulkiness is calculated from the mass and the volume (0.25 m³). Individual results and a mean value from three tests are to be indicated. A bulkiness according to the invention of the natural fibers is between 30 kg/m³ and 50 kg/m³, preferably between 35 and 60 kg/m³.

The natural fibers produced by the process described above are then packaged and fed to further use.

For use as an insulating material, the natural fibers can either be formed into insulating boards or introduced directly into a structure as blow-in insulation.

For use as a fiber reinforcement for a plastics material, the natural fibers are mixed with granules of a plastics material, the granules being distributed in the pores of the natural fiber matrix owing to the high bulkiness. The natural fibers provided with the granules are then fed to a device for agglomeration, in this case an extruder. In the extruder, the natural fibers provided with the granules are compressed and heated. The remainder of the moisture contained in the natural fibers thereby escapes and leaves the extruder as steam. The heating of the natural fibers and the removal of the residual amounts of water causes activation of the adhesion promoter which, through direct contact both with the natural fibers and with the plastics material, enters into a firm bond with both substances, so that the natural fibers are firmly bonded in the plastics material. Furthermore, the plastics material melts, the natural fibers being distributed uniformly in the molten plastics material by the screw arranged in the extruder. After melting, the mixture of natural fibers and plastics material is pressed through a sieve along which a cutting blade scrapes. In that manner, pellets of a fiber-reinforced plastics material are formed.

There is used as the starting material of the plastics material a thermoplastic plastics material, in particular polypropylene or polyethylene, it being possible for the two plastics materials mentioned above also to be in the form of recycled material.

The pellets so produced can be processed using conventional installations for plastics processing; in particular, the pellets can be processed in conventional injection molding and extrusion installations. In order to produce a plastics article of fiber-reinforced plastics material, the pellets are fed to an injection molding or extrusion installation, where they are shaped into articles.

A test specimen consisting of a fiber-reinforced plastics material comprising 50% by weight of the natural fibers according to the invention and 50% by weight of polypropylene achieves the following values:

| | |
|---|---|
| Density | 0.82 g/cm³ |
| Tensile strength (ISO 527) | 32 MPa |
| Tensile modulus of elasticity (ISO 527) | 4000 MPa |
| Charpy impact strength (ISO 179) | 11 kJ/m² |

The melt flow index, as the index of the flow behavior of a thermoplastic plastics material, is lowered by only 20% compared with a pure polypropylene. This indicates similarly good processability of the fiber-reinforced plastics material compared with a pure plastics material. However, the strength values are improved significantly compared with pure polypropylene. Both the tensile modulus of elasticity and the impact strength of the fiber-reinforced plastics material are substantially better than the comparison values of a pure polypropylene. The values for pure polypropylene as a new product are:

| | |
|---|---|
| Density | 0.9 g/cm³ |
| Tensile strength (ISO 527) | 26 MPa |
| Tensile modulus of elasticity (ISO 527) | 1450 MPa |
| Charpy impact strength (ISO 179) | 5 kJ/m² |

Based on the density, the strength values of the fiber-reinforced plastics material are improved significantly compared with pure plastics material, so that, on account of the better strength, a further weight reduction, and accordingly a saving in terms of material, is possible. The wall thickness of a plastics article, for example, can thus be reduced.

It has further been found, surprisingly, that a test specimen consisting of ground, that is to say reprocessed, fiber-reinforced plastics material of the type described above has a tensile strength that is likewise 32 MPa and accordingly behaves in a manner comparable to that of an unprocessed test specimen. Accordingly, it is shown that the fiber-reinforced plastics material according to the invention is particularly suitable for recycling.

The invention claimed is:

1. A process for providing and processing natural fibers, wherein the process comprises the following steps:
   1) providing a biomass comprising natural fibers and having a dry matter content of not more than 50% by weight;
   2) adding water in order to prepare a suspension comprising the biomass;
   3) extracting the natural fibers from the suspension;
   4) separating liquid from the extracted natural fibers;
   5) repeating at least one of steps 2) to 4) at least once, wherein in the last repetition of at least one of steps 2) to 4), an adhesion promoter is added to the suspension for finishing the natural fibers; and
   6) drying the natural fibers.

2. The process as claimed in claim 1, wherein the drying of the fibers is carried out in a multi-stage process.

3. The process as claimed in claim 1, wherein the drying comprises drying in a belt drier.

4. The process as claimed in claim 1, wherein the drying comprises drying in an air stream.

5. The process as claimed in claim 1, wherein in the last repetition of at least one of steps 2) to 4), adding at least one of a flame retardant, a light stabilizer, or a dye to the suspension.

6. The process as claimed in claim 1, wherein the adhesion promoter comprises a carboxylated polypropylene.

7. The process as claimed in claim 1, wherein the adhesion promoter comprises maleic anhydride.

8. The process as claimed in claim 1, wherein the natural fibers do not exceed a content of dry matter of 90% prior to the drying.

9. The process as claimed in claim 1, wherein the biomass comprising the natural fibers comprises grass cuttings, rye green waste, bargasse, and/or spent grains.

10. The process as claimed in claim 1, wherein during the drying step a drying temperature and a drying time is selected so that after the step of drying the natural fibers, the residual moisture content of the fibers does not fall below of 5% by weight and so that cornification of the natural fibers does not take place even when drying is complete.

11. The process as claimed in claim 10, wherein after the step of drying the natural fibers, the residual moisture content of the natural fibers is 8 to 12% by weight.

12. The process as claimed in claim 1, wherein after the step of drying the natural fibers further comprises a first drying stage using warm air having a temperature of 60° to 80° C. and a second drying stage using warm air having a temperature of 75° to 110° C.

13. The process as claimed in claim 12, wherein the first drying stage takes place in a belt dryer.

14. The process as claimed in claim 12, wherein the second drying stage takes place in a dispersion dryer.

15. The process as claimed in claim 12, wherein the first drying stage has a dwell time of 25 to 35 minutes.

16. The process as claimed in claim 12, wherein the second drying stage has a dwell time of 0.5 to 3 seconds.

17. The process as claimed in claim 1, wherein after the step of drying the natural fibers further comprises:
   a first drying stage taking place in a belt dryer using warm air having a temperature of 60° to 80° C. for a dwell time of 25 to 35 minutes; and
   a second drying stage taking place in a dispersion dryer using warm air having a temperature of 75° to 110° C. for a dwell time of 0.5 to 3 seconds;
   wherein the residual moisture content of the fibers does not fall below of 5% by weight and so that significant cornification of the natural fibers does not occur when drying is complete.

* * * * *